(12) United States Patent
Griffin et al.

(10) Patent No.: US 7,224,739 B2
(45) Date of Patent: May 29, 2007

(54) CONTROLLED FREQUENCY SIGNALS

(75) Inventors: Jed D. Griffin, Forest Grove, OR (US); Jerry G. Jex, Olympia, WA (US); Brett A. Prince, Beaverton, OR (US); Keith M. Self, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 10/226,074

(22) Filed: Aug. 21, 2002

(65) Prior Publication Data

US 2004/0037362 A1    Feb. 26, 2004

(51) Int. Cl.
  *H04L 27/00* (2006.01)
  *H04L 7/00* (2006.01)
  *H04L 5/14* (2006.01)
  *H04B 1/00* (2006.01)

(52) U.S. Cl. .............. 375/259; 375/295; 375/354; 370/202; 455/43

(58) Field of Classification Search ........ 375/259, 375/354, 295; 370/488, 202; 455/43
See application file for complete search history.

(56) References Cited

U.S. PATENT DOCUMENTS

| | | | |
|---|---|---|---|
| 3,665,474 A | 5/1972 | Thayer | |
| 4,569,017 A | 2/1986 | Renner et al. | |
| 4,663,767 A | 5/1987 | Bodlaj et al. | |
| 5,103,463 A | 4/1992 | Schoeneberg | |
| 5,317,597 A | 5/1994 | Eisele | |
| 5,347,543 A | 9/1994 | Lecoco et al. | |
| 5,491,434 A | 2/1996 | Harnishfeger et al. | |
| 5,519,526 A * | 5/1996 | Chua et al. | 398/139 |
| 5,623,518 A | 4/1997 | Pfiffner | |
| 5,821,779 A | 10/1998 | Martwick | |
| 5,862,180 A | 1/1999 | Heinz | |
| 5,898,735 A | 4/1999 | Yamauchi | |
| 6,154,498 A | 11/2000 | Dabral et al. | |
| 6,693,917 B1 * | 2/2004 | Feldman et al. | 370/488 |
| 6,873,829 B2 * | 3/2005 | Jeung | 455/118 |

FOREIGN PATENT DOCUMENTS

| | | |
|---|---|---|
| EP | 0 110 427 A | 6/1984 |
| EP | 0 917 324 A2 | 5/1999 |

OTHER PUBLICATIONS

Zhang Jianfeng et al., DC-balanced line encoding for optical labeling scheme using orthogonal modulation; Research Center COM, Technical University of Denmark, 2003 Optical Sociaty of America; pp. 1-3.*
COUCH—Digital and Analog Communication Systems, pp. 160-169, 337-352, and 487-495 (Prentice Hall, 2001, 1997).
P14339 PCT Search Report.
PCT International Preliminary Examination Report.
PCT Written Opinion Dated Nov. 22, 2004.

* cited by examiner

*Primary Examiner*—Mohammed Ghayour
*Assistant Examiner*—Cicely Ware
(74) *Attorney, Agent, or Firm*—Blakely, Sokoloff, Taylor & Zafman LLP

(57) ABSTRACT

In some embodiments, a transmitter includes first encoding controlled frequency output circuitry to creates a magnitude encoded controlled frequency signal (CFS) and second encoding controlled frequency output circuitry to create a complementary a magnitude encoded controlled frequency signal (CCFS). Other embodiments are described and claimed.

28 Claims, 14 Drawing Sheets

Example for In Phase Encoding/Decoding

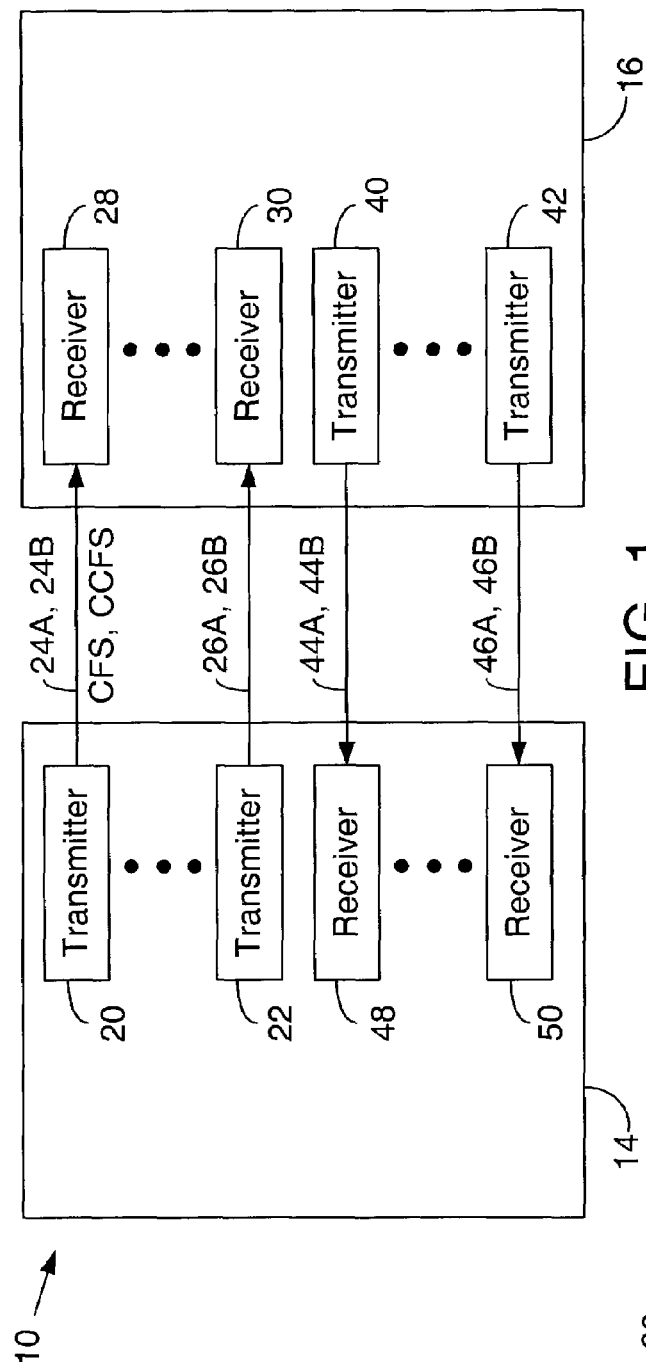
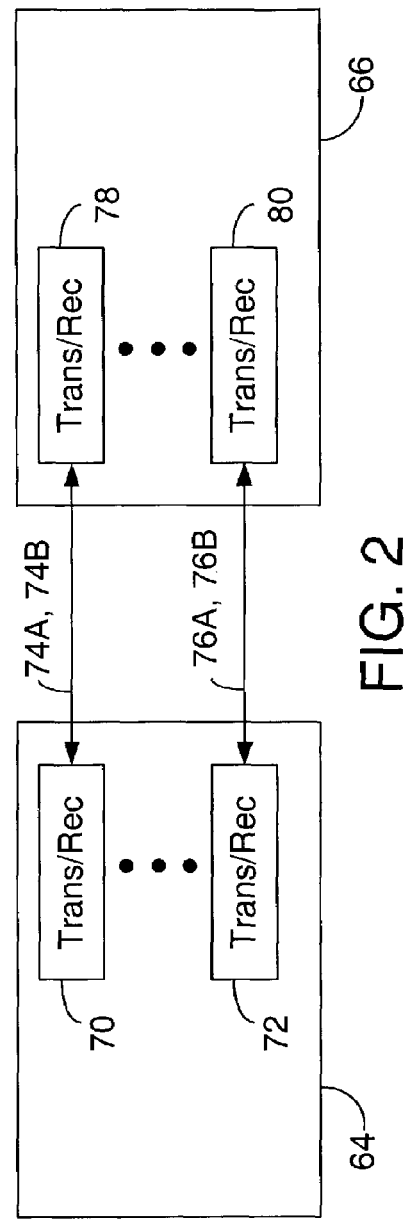

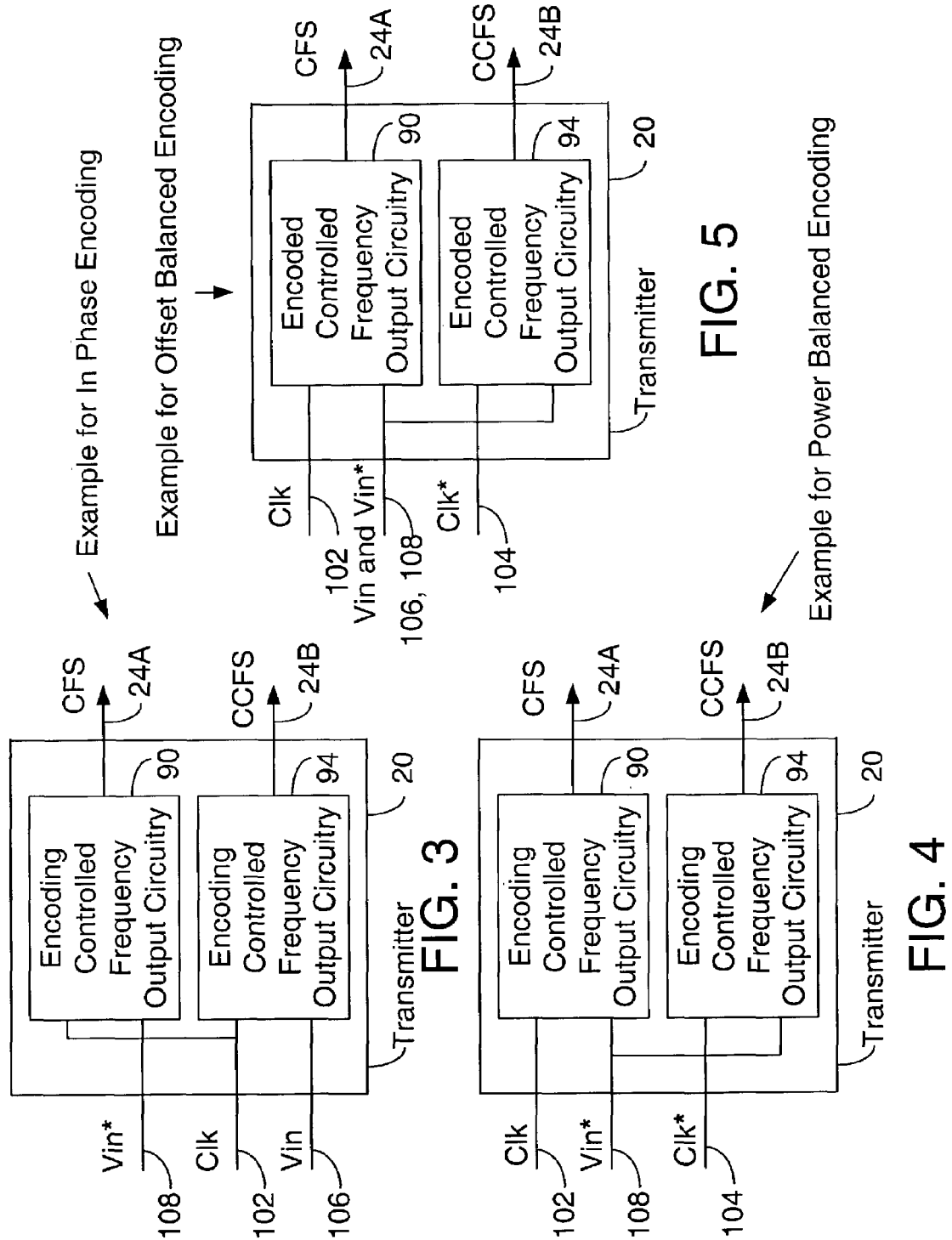

FIG. 8  Example for In Phase Encoding/Decoding

FIG. 9  Example for In Phase Encoding
(Power Balanced Encoding similar)

FIG. 10 Example For Offset Balanced Encoding

Example for Decoding of In Phase Encoded Signals

FIG. 12  Example for Decoding of Power Balanced Encoded Signals

FIG. 13  Example for Decoding of In Phase and Power Balanced Encoded Signals

Example for Decoding of In Phase and Power Balanced Encoded Signals

Example for Decoding of Offset Balanced Encoded Signals

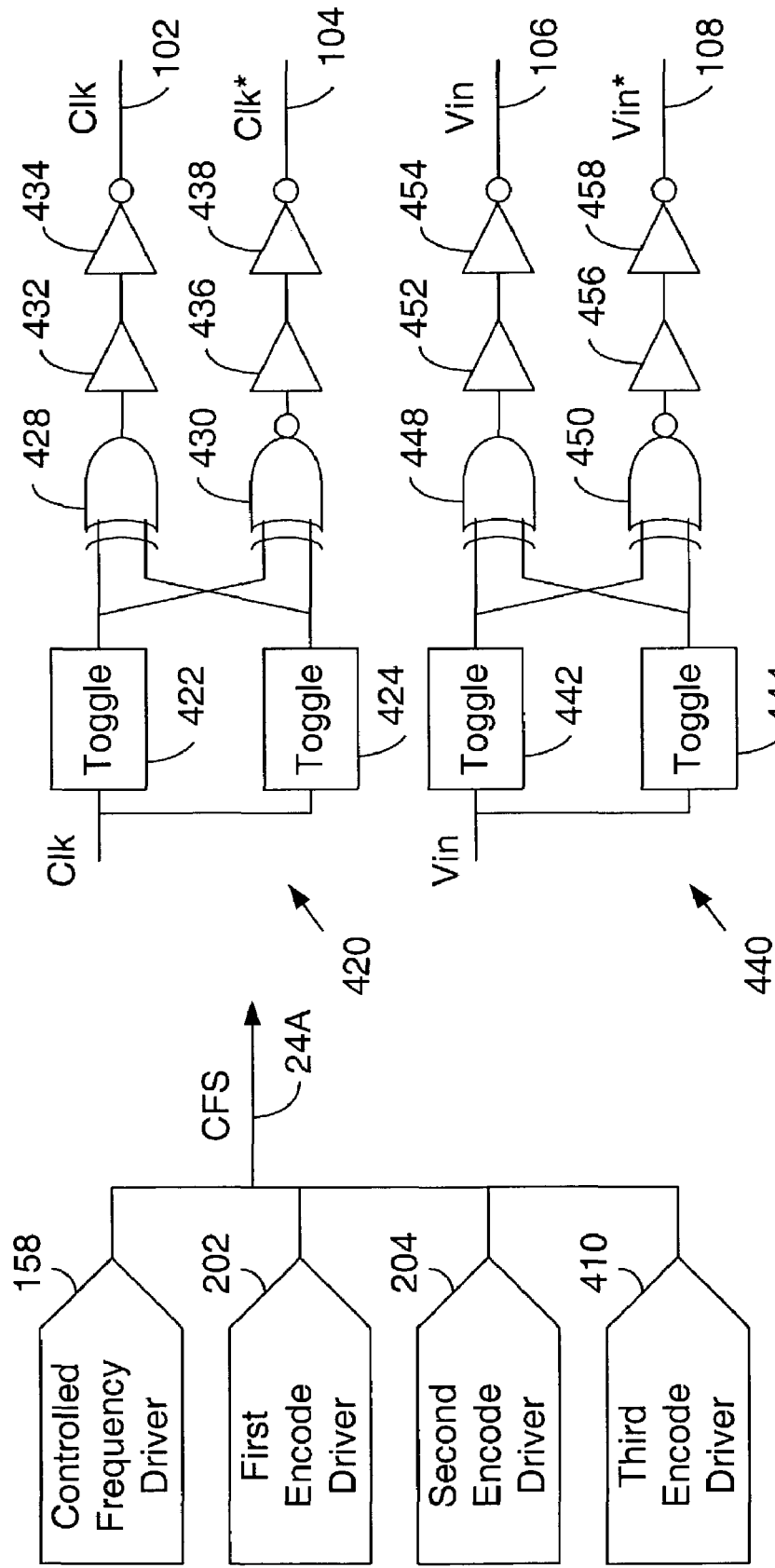

CONTROLLED FREQUENCY SIGNALS

RELATED APPLICATION

The present application and application Ser. No. 10/225,691 entitled "Receivers for Controlled Frequency Signals" were filed on the same day, have essentially identical specifications, and claim related subject matter.

BACKGROUND OF THE INVENTION

1. Technical Field of the Invention

The inventions relate to transmitters and receivers that provide and receive controlled frequency signals and systems including such transmitters and receivers.

2. Background Art

Inter symbol interference (ISI) degrades signal integrity through superimposition of pulses at varying frequencies. Data patterns with high frequency pulses are susceptible to ISI. Higher frequency pulses may phase shift more and attenuate more relative to lower frequency pulses leading to loss of the higher frequency pulses when superimposed with lower frequency pulses. The distortion to data patterns caused by ISI may lead to errors. The frequency at which uncompensated random data patterns in conventional signaling can be transmitted may be limited by ISI.

Equalization and Nyquist signaling are two solutions to ISI that have been proposed. Equalization is a curve-fitting solution that attempts to restore amplitude for higher frequency pulses in susceptible data patterns. It seeks to anticipate lost data and restore it through pre-emphasizing the amplitude on narrow pulses. Disadvantages of equalization include that it is at best a curve fitting solution, tweaking the amplitude of higher frequency pulses in random pulses of data to restore any anticipated loss in amplitude. The anticipated loss is very system specific and pattern specific, thus requiring tuning for predicted data patterns and for each custom system it is used in. It is susceptible to unpredicted data patterns and varying system transfer functions. The iterative nature of such solutions results in time-consuming and system-specific implementations, possibly never converging to optimal solutions.

Nyquist Signaling is another prior art solution for ISI, which uses a raised cosine or sinc function pulses in the time domain to overcome ISI. The complexity to implement such functions is prohibitive in practice.

In source synchronous signaling, data signals and one or more associated clock or strobe signals are sent from a transmitter to a receiver. The clock or strobe signal is used by the receiving circuit to determine times to sample the data signals.

In some signaling techniques, timing information can be embedded into the transmitted data signal and recovered through a state machine. An interpolator receives a number of clock or strobe signals from, for example, a phase locked loop or a delayed locked loop. The recovered timing is used to select among or between the clock or strobe signals received by the interpolator and provide the selected clock or strobe signal to a receiver to control sampling of the incoming data signal. In some implementations, training information is provided in the data signal to get the proper sample timing before actual data is transmitted. The training information can be provided from time to time to keep the sample timing. In other implementations, training information is not used, but the sample timing is created from the data signals of prior time. There are various techniques for embedding timing information. The 8B/10B technique is a well known technique.

The transmission of signals may be in a multi-drop (one transmitter to multiple receivers) or point-to-point (one transmitter to one receiver). The transmission may be uni-directional, sequential bi-direction, or simultaneous bi-directional.

Noise on signals on conductors may cause the signals to be corrupted. A technique to reduce the effect of noise is to transmit the data on two wires and then reject the noise in the receiver by looking at the difference between the received signals rather than the absolute values. Typically, one conductor carries a signal that is the inverse of the other conductor.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

FIG. 1 is a block diagram representation of a system according to some embodiments of the inventions.

FIG. 2 is a block diagram representation of a system according to some embodiments of the inventions.

FIG. 3 is a block diagram representation of a transmitter in FIG. 1 according to some embodiments of the inventions.

FIG. 4 is a block diagram representation of a transmitter in FIG. 1 according to some embodiments of the inventions.

FIG. 5 is a block diagram representation of a transmitter in FIG. 1 according to some embodiments of the inventions.

FIG. 19 is a schematic block diagram representation of encoding controlled frequency output circuitry according to some embodiments of the inventions.

FIG. 20 is a schematic block diagram representation of circuitry used to create Clk and Clk* signals and circuitry used to create Vin and Vin* signals for use in some embodiments of the inventions.

DETAILED DESCRIPTION

Figure 6:
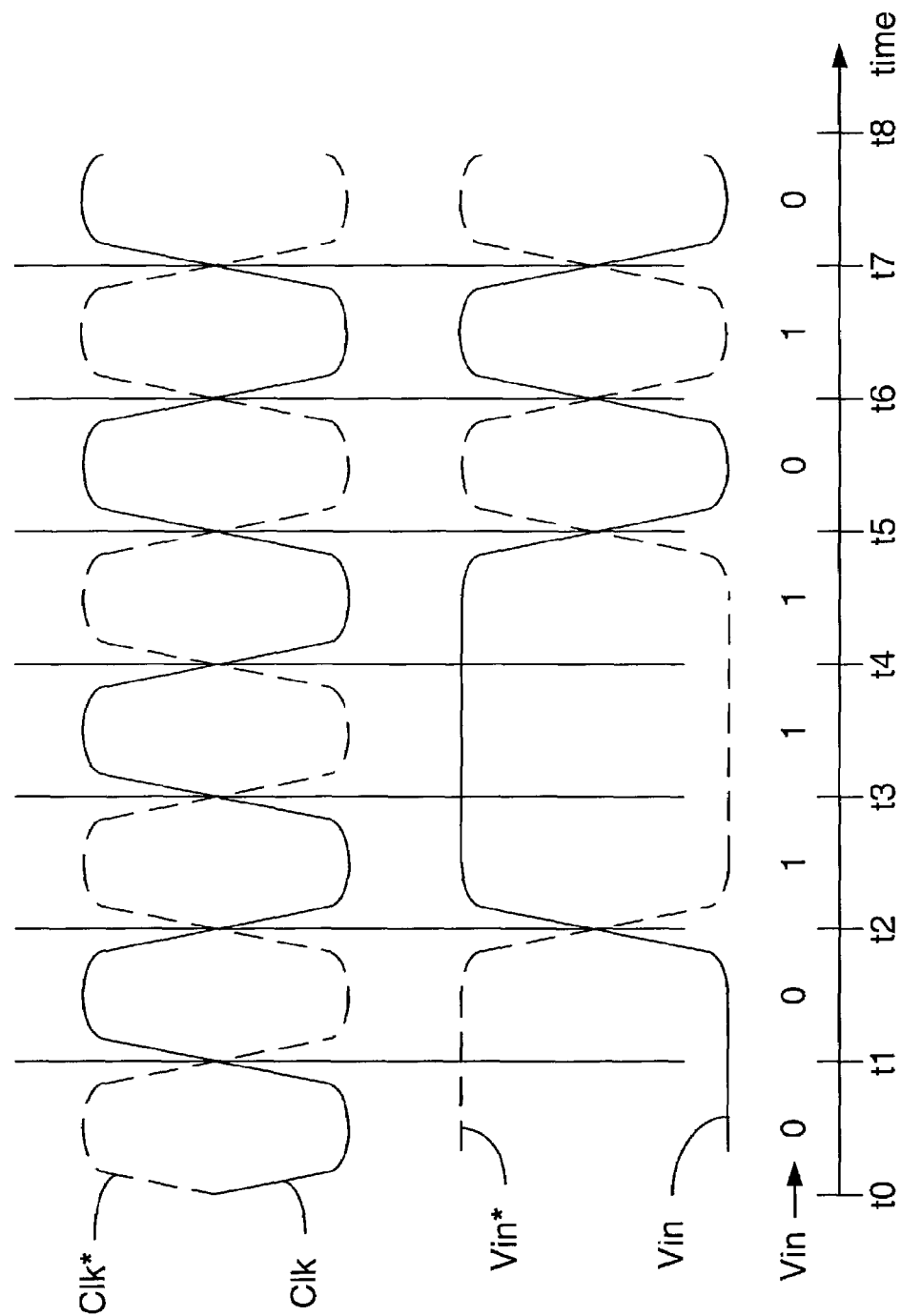
FIG. 6 is a graphical representation of Clk and Clk* signals and Vin and Vin* signals that may be used in some embodiments of the inventions.

In some embodiments, the inventions described herein include a system having a transmitter that encodes a data signal into a magnitude encoded controlled frequency signal (CFS). In some embodiments, a complementary magnitude encoded controlled frequency signal (CCFS) is also created. The voltage of CFS is VCFS and the voltage of CCFS is VCCFS.

Referring to FIG. 1, a system 10 includes a chip or portion of a chip 14 and a chip or portion of a chip 16. In the case in which 14 and 16 represent portions of chips, they may be in the same chip. Transmitters 20 . . . 22 represent N transmitters, conductors 24A, 24B . . . 26A, 26B represent N sets of two conductors, and receivers 28 . . . 30 represent N receivers. Transmitters 20 . . . 22 provide CFS and CCFS on conductors 24A, 24B . . . 26A, 26B to receivers 28 . . . 30. Transmitters 40 . . . 42 represent M transmitters, conductors 44A, 44B . . . 46A, 46B represent M sets of two conductors, and receivers 48 . . . 50 represent M receivers. M may be the same number as N or a different number. Transmitters 40 . . . 42 provide CFS and CCFS on conductors 44A, 44B . . . 46A, 46B to receivers 48 . . . 50. Transmitters and receivers may be treated in groups of pairs of transmitters and receivers.

In FIG. 1, conductors 24A, 24B . . . 26A, 26B, and 44A, 44B . . . 46A, 46B are shown as transmitting signals in a single direction. Alternatively, bi-directional conductors may be used. For example, in FIG. 2, a system 60 includes a chip or portion of a chip 64 and a chip or a portion of a chip 66 in which transmitter/receivers 70 . . . 72 are coupled to transmitter/receivers 78 . . . 80 through bi-directional conductors 74A, 74B . . . 76A, 76B. The transmission may be sequential bi-directional or simultaneous bi-directional.

1. Transmitters.

There are a variety of ways in which the transmitters of FIGS. 1 and 2 may be constructed. As examples, FIGS. 3–5 illustrate different embodiments of transmitter 20 (also shown in FIG. 1). In FIGS. 3–5, transmitter 20 includes a first encoding controlled frequency output circuitry 90 to create the CFS on conductor 24A and a second encoding controlled frequency output circuitry 94 to create the CCFS on conductor 24B. Encoding controlled frequency output circuitry 90 and 94 each receive at least one clock signal and at least one input signal. It is somewhat arbitrary which signal is referred to as CFS and which is referred to as CCFS. However, the receivers should route CFS and CCFS appropriately to get the desired polarities.

A clock signal (Clk) is carried on a conductor 102, an inverse of Clk (Clk*) is carried on a conductor 104, an input signal (Vin) is carried on a conductor 106, and an inverse input signal (Vin*) is carried on conductor 108. As can be seen, in FIG. 3, encoding controlled frequency output circuitry 90 receives Clk and Vin* signals and encoding controlled frequency output circuitry 94 receives Clk and Vin signals. In FIG. 4, encoding controlled frequency output circuitry 90 receives Clk and Vin* signals and encoding controlled frequency output circuitry 94 receives Clk* and Vin* signals. In FIG. 5, encoding controlled frequency output circuitry 90 receives Clk, Vin, and Vin* signals and encoding controlled frequency output circuitry 94 receives Clk*, Vin, and Vin* signals. Of course, these are just examples and with modifications to transmitter 20 or receiver 28, different polarities of the clock and input signals could be received by transmitters 20 of FIGS. 3–5.

FIG. 6 illustrates representative examples of Clk, Clk*, Vin, and Vin* over time t0 . . . t8. However, Clk, Clk*, Vin, and Vin* may be shaped somewhat different than is shown. For example, they may be more sinusoidal in shape or more square wave in shape. In the particular example of FIG. 6, a state of Vin in time periods t0 . . . t8 is 0 0 1 1 1 0 1 0.

Figure 7:
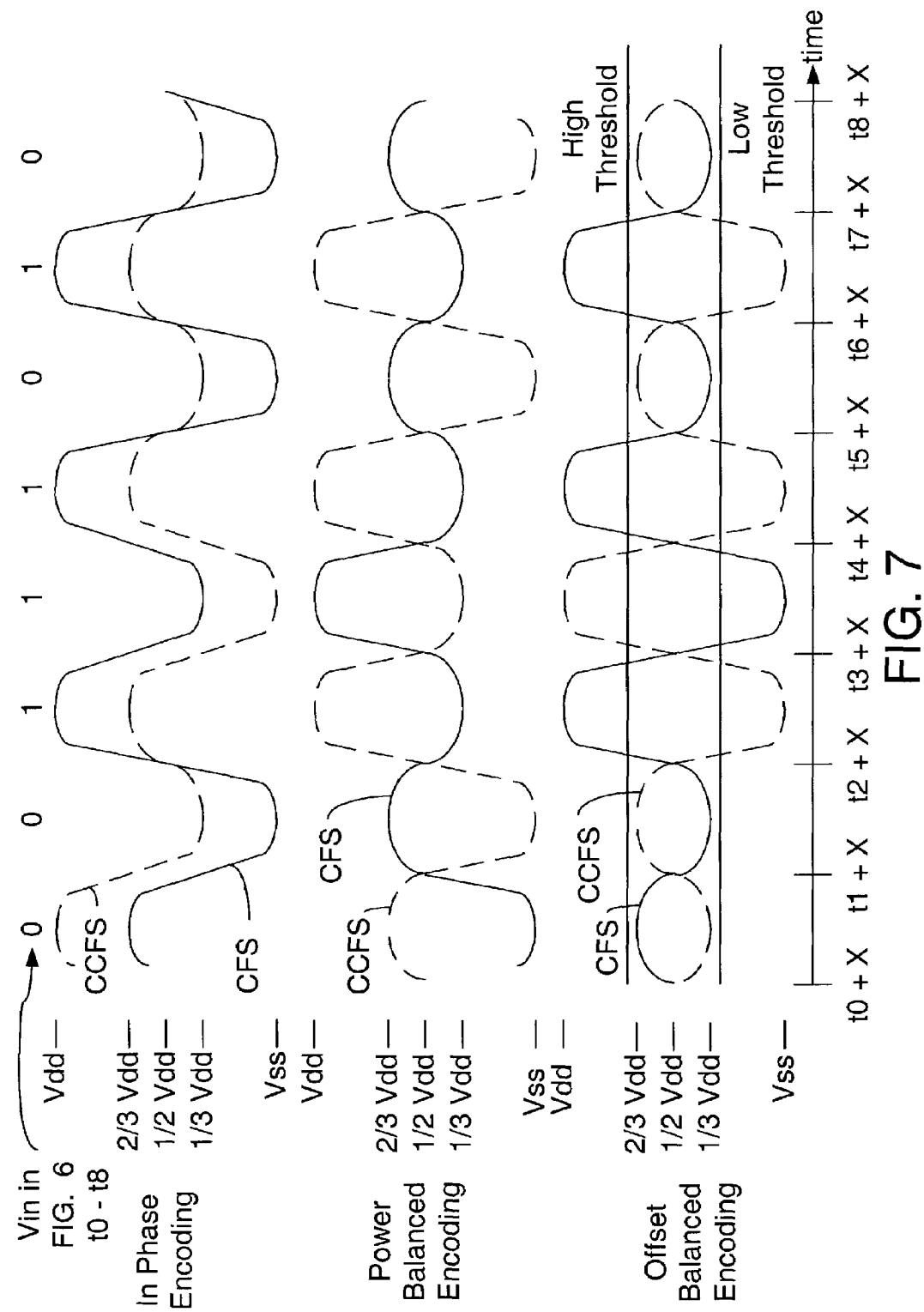
FIG. 7 is a graphical representation of magnitude encoded controlled frequency signals (CFS) and complementary magnitude encoded controller frequency signals (CCFS) that may be produced through various encoding schemes according to some embodiments of the inventions.

There are a variety of encoding techniques that can be used in connection with the CFS and CCFS. Examples of the encoding techniques include in phase magnitude encoding ("In Phase Encoding"), power balanced magnitude encoding ("Power Balanced Encoding"), and offset balanced magnitude encoding ("Offset Balanced Encoding"). Examples of these three encoding techniques in response to three or four of the Clk, Clk*, Vin, and Vin* signals of FIG. 6 are illustrated in FIG. 7 over a time period t0+X . . . t8+X. The state of Vin for times t0 . . . t8 is also shown. VDD is the power supply voltage and VSS is the ground reference voltage. There may be other power supply voltages and ground reference voltages in the system.

In FIG. 7, CFS and CCFS for In Phase Encoding are provided by transmitter 20 of FIG. 3. The CCFS is shown with a dashed line. In the example of FIG. 7, for In Phase Encoding, CFS and CCFS represent a logical 0 (low) voltage if CCFS>CFS and a logical 1 (high) voltage if CFS>CCFS at some particular sampled time. Other methods could be used to determine the logical value represented by CFS and CCFS. For each of the encodings of FIG. 7, the choice of logical 0 or 1 voltages in a particular signal is arbitrary as long as there is consistency and the opposite logical value (inverse) could have been chosen. Asserted high logic is described herein, but asserted low logic could be used.

In FIG. 7, CFS and CCFS for Power Balanced Encoding are provided by transmitter 20 of FIG. 4. In the example of FIG. 7, for Power Balanced Encoding, CFS and CCFS represent a logical 0 voltage when the average value is less than VDD/2 and a logical 1 voltage when the average value is greater than VDD/2. Other methods could be used to determine the logical value represented by CFS and CCFS.

In FIG. 7, CFS and CCFS for Offset Balanced Encoding are provided by transmitter 20 of FIG. 5. In the example of FIG. 7, for Offset Balanced Encoding, CFS and CCFS represent a logical 0 voltage when CFS and CCFS are inside the high and low thresholds and logical 1 voltage when CFS and CCFS are outside the high and low thresholds. Other methods could be used to determine the logical value represented by CFS and CCFS.

In FIG. 7, the choice of which signals are labeled CFS and which are labeled CCFS is arbitrary, although routing of the signals and circuitry may change depending on the choice.

Figure 8:
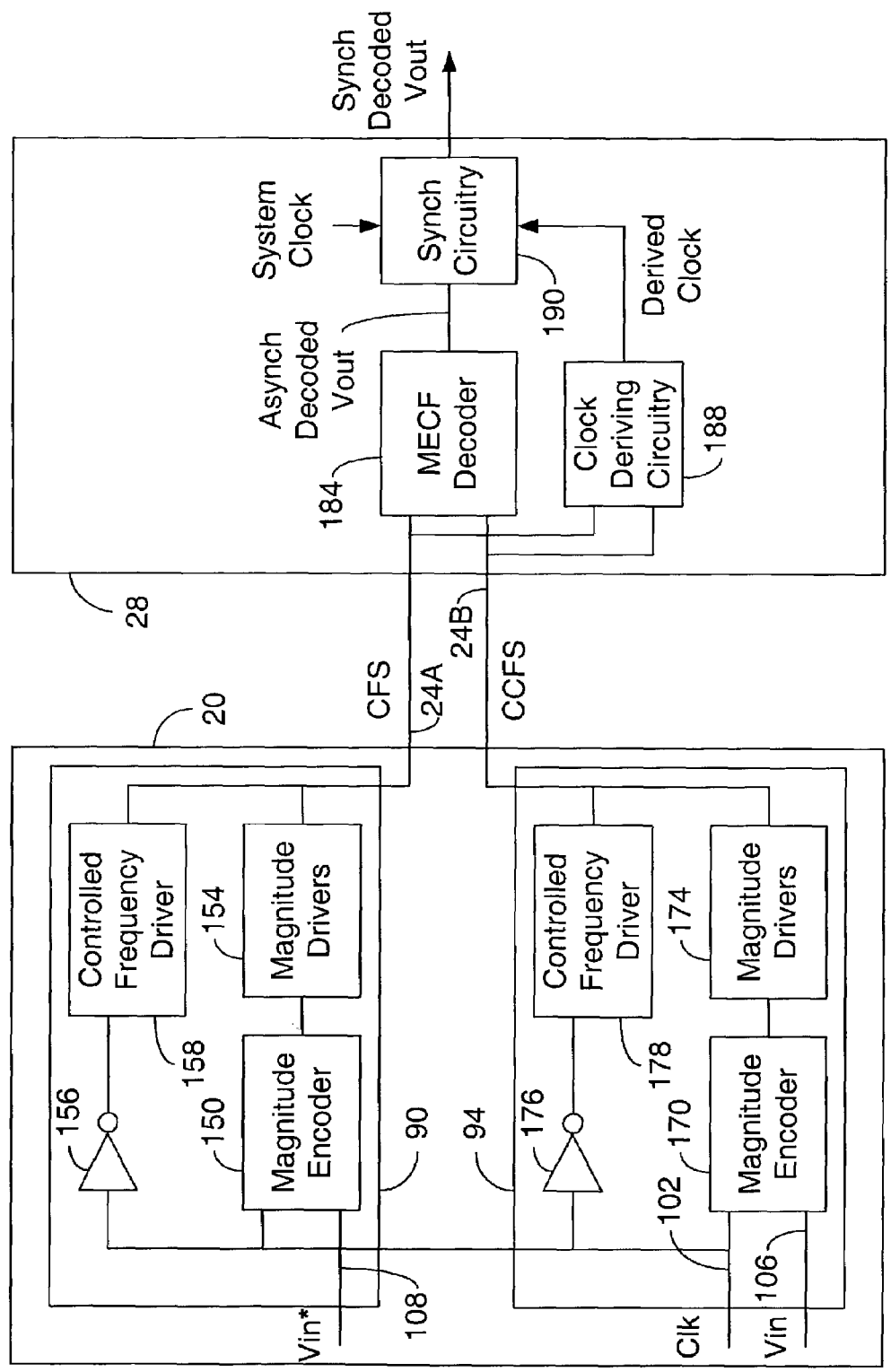
FIG. 8 is a schematic block diagram representation of system including a transmitter, a receiver and conductors in FIG. 1 according to some embodiments of the inventions.

FIG. 8 illustrates additional details regarding some embodiments of transmitter 20 of FIG. 3 (for In Phase Encoding) and receiver 28 (for decoding of signals encoded with In Phase Encoding). The inventions are not limited to these details. Encoding controlled frequency output circuitry 90 and 94 can be used for Power Balanced Encoding, but with the different inputs shown in FIG. 4. The Clk and Vin* signals are received on conductors 102 and 108 by encoding controlled frequency output circuitry 90 and the Clk and Vin signals are received on conductors 102 and 106 by encoding controlled frequency output circuitry 94. In the example of FIG. 8, encoding controlled frequency output circuitry 90 and 94 are identical, but they could be different. An advantage of them being identical is that it may lead to tighter timing tolerances between CFS and CCFS. The Clk signal is received by magnitude encoders 150 and 170 and inverters 156 and 176. The inverted clock signals from inverters 156 and 176 are provided to controlled frequency drivers 158 and 178, respectively. Magnitude encoders 150 and 170 provide signals to magnitude drivers 154 and 174, respectively, such that the combination of magnitude drivers 154 and 174 and controlled frequency drivers 158 and 178 provide the desired CFS on conductor 24A and CCFS on conductor 24B. Examples of magnitude encoders 150 and 170 are provided in FIGS. 9 and 10. Receivers are discussed in the next section.

Figure 9:
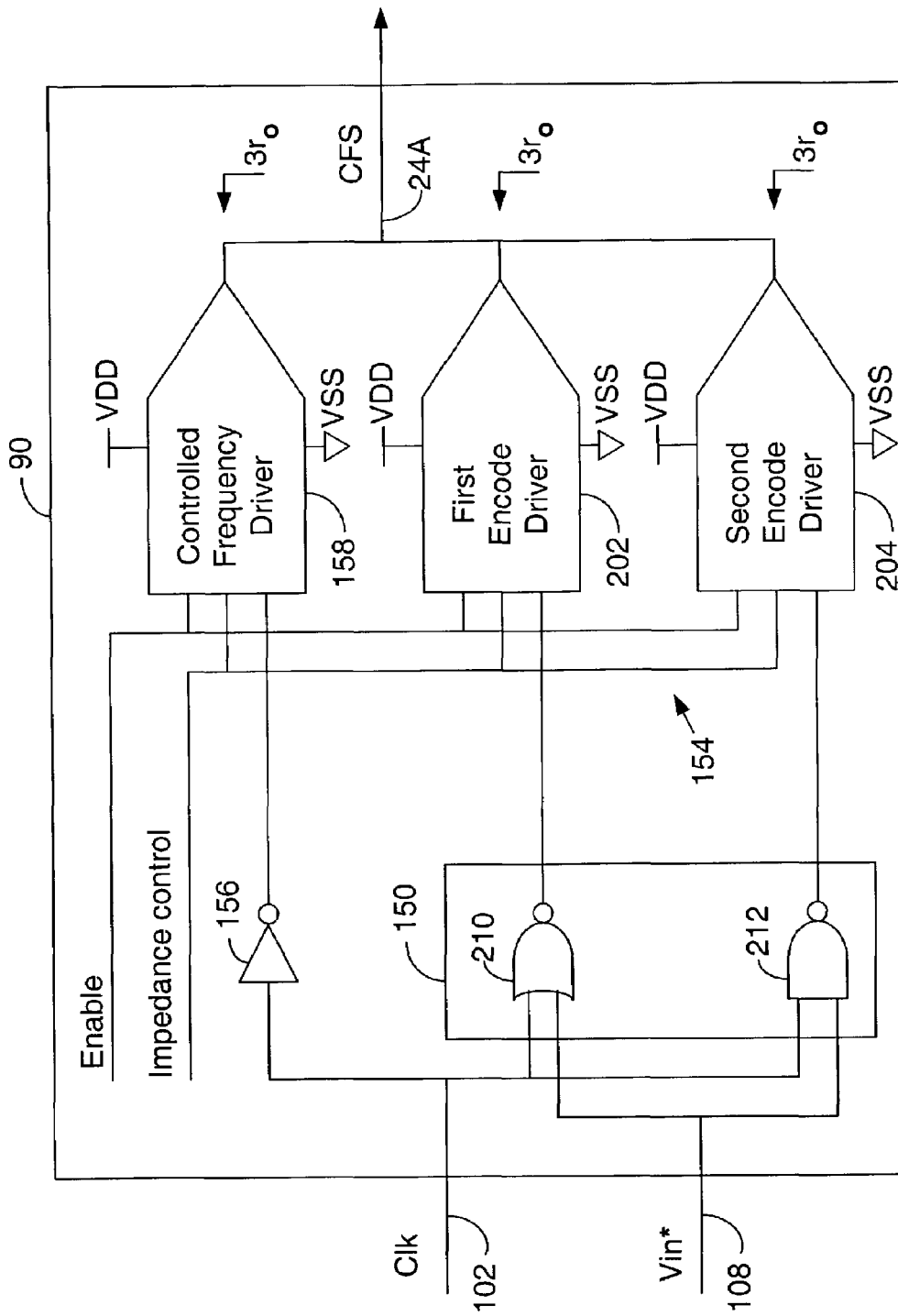
FIG. 9 is a schematic block diagram representation of the encoding controlled frequency output circuitry of FIGS. 3 and 8 according to some embodiments of the inventions.

FIG. 9 provides additional details of some embodiments of encoding controlled frequency output circuitry 90 of FIG. 3. The inventions are not limited to these details. Magnitude encoder 150 includes an NOR gate 210 and a NAND gate 212, each of which receive Clk and Vin*. In the example of FIG. 9, magnitude drivers 154 includes first encode driver 202 and second encode driver 204. Controlled frequency driver 158 and first and second encode drivers 202 and 204 receive impedance control signals to create an output impedance of $3r_o$ where $r_o$ is the characteristic impedance of conductor 24A. An enable signal is also shown. The impedance and enable signals are not required. When the input to driver 158 is a logical 1 voltage, it tries to pull its output (which is coupled to conductor 24A) to its power supply voltage VDD. When the input to driver 158 is a logical 0 voltage, it tries to pull its output to its ground voltage VSS. Likewise, then the inputs of first and second encode drivers 202 and 204 are a logical 1 voltage, they try to pull their respective outputs to VDD, and when the inputs are a logical 0 voltage, they try to pull their outputs to VSS.

Accordingly, the voltage of CFS is a function of the inputs to drivers 158, 202, and 204. For example, if the inputs to drivers 158, 202, and 204 are each a logical 1 voltage, each of drivers 158, 202, and 204 is pulling to VDD, and CFS on conductor 24A is pulled to VDD. Likewise, if the inputs are each a logical 0 voltage, then CFS is pulled to VSS. When one of the inputs to drivers 158, 202, and 204 is a logical 1 voltage and two inputs are logical 0 voltage, CFS is pulled to ⅓ VDD. When two of the inputs to drivers 158, 202, and 204 are logical 1 voltages and one input is a logical 0 voltage, CCFS is pulled to ⅔ VDD. (The inventions are not limited to these details. For example, drivers 158, 202, and 204 could invert the input value.)

Table 1 shows the outputs of NOR gate 210 and NAND gate 212 as a function of Clk and Vin. The outputs of gates 210 and 212 are the inputs of drivers 202 and 204, respectively. The table also shows the output of inverter, 156 (which is the input of driver 158), and a value of CFS as a function of the outputs of driver 158 and first and second encode drivers 202 and 204.

Of course, the full high voltage signal is not necessarily exactly at VDD, the medium low voltage signal is not necessarily exactly at ⅓ VDD, the medium high voltage signal is not necessarily exactly at ⅔ VDD, and the full low signal is not necessarily exactly at VSS.

The transmitter 20 in FIG. 4 may be the same as in FIG. 3, except with different inputs. Alternatively, the transmitter 20 for FIG. 5 could be somewhat different than that for FIG. 4.

Figure 10:
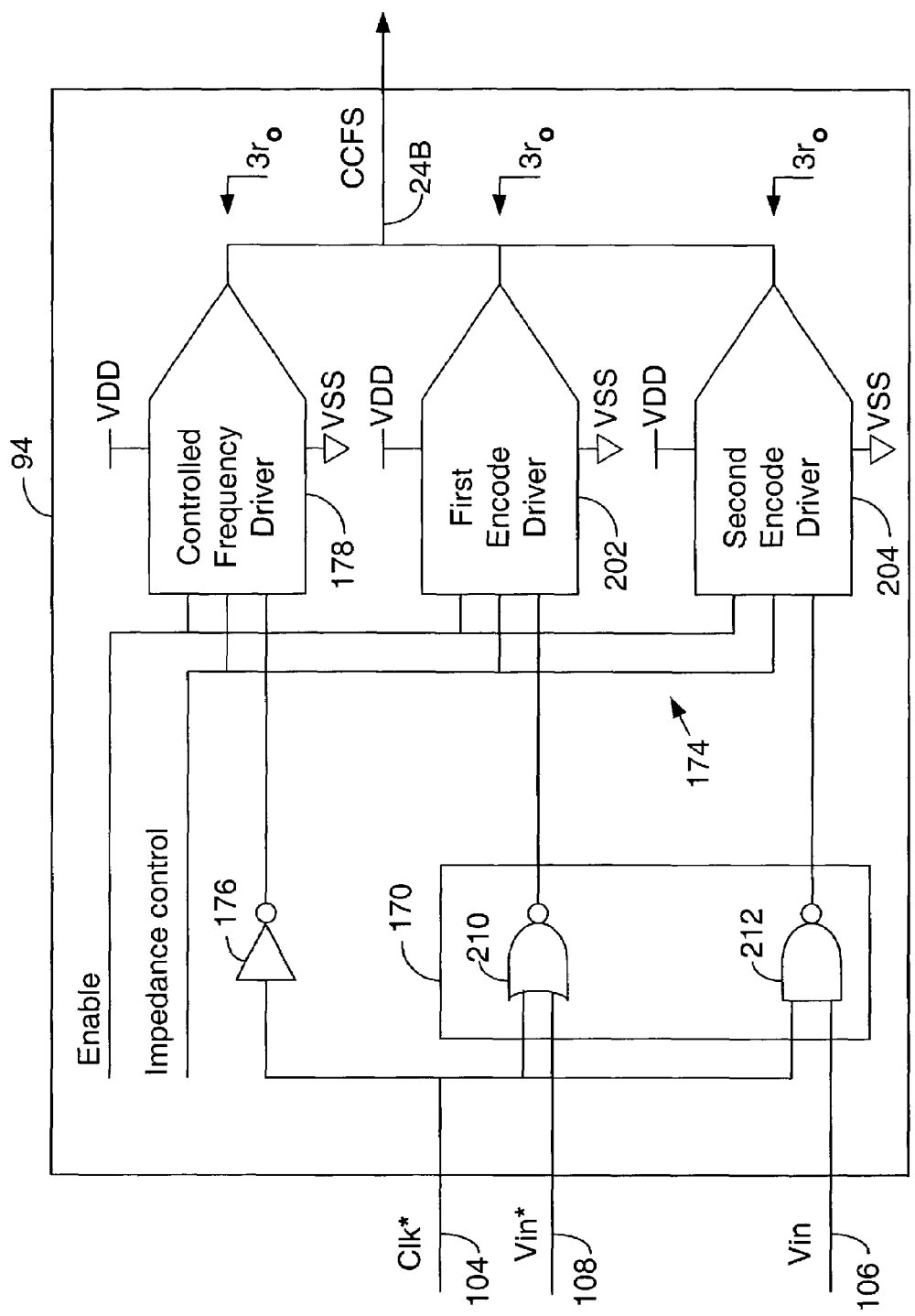
FIG. 10 is a schematic block diagram representation of the encoding controlled frequency output circuitry of FIG. 5 according to some embodiments of the inventions.

FIG. 10 shows an example of encoding controlled frequency output circuitry 94 for FIG. 5. Encoding controlled frequency output circuitry 90 may be the same with different input signals as shown in FIG. 5. In FIG. 10, magnitude encoder 170 is the same as magnitude encoder 150 in FIG. 9, except for the different input signals as shown. Magnitude drivers 174 are the same as magnitude drivers 154, but could be different. Controlled frequency driver 178 is the same as controlled frequency driver 158, but could be different.

The combination of CFS and CCFS allows good signal integrity at higher frequencies of data transmission by canceling noise and facilitating decoding. The signals also inherently carry some immunity to (ISI). Merely as an example, a mathematical model of magnitude encoded controlled frequencies is provided in equation (1), which shows a Fourier transform as follows:

$$s(t)=(B+E \cdot m[\text{trunc}(t/2\omega_0)])\cos \omega_0 t+VDD/2 \leftrightarrows S(\omega)= (B+\alpha \cdot E)\delta(\omega_0)+C \quad (1)$$

where t is time, s(t) is a function in the time domain, $\omega$ is frequency, $\omega_0$ is a control frequency (a frequency the data is encoded at), m is an array of encoded digital values (comprising data pattern), B is a constant value for base, E is a constant value for encode high, VDD is a supply voltage, $S(\omega)$ is the function in the frequency domain, $\alpha$ is a ratio of 1s to 0s in m, $\delta(\omega_0)$ is an impulse function, and C is a constant DC offset. The impulse function in the frequency domain, with data encoded on it, yields the benefits of eliminating or substantially reducing ISI since all or substantially all of the energy of the signal is restricted to a single frequency. The inventions are not limited to the details of equation (1).

2. Receivers.

Receivers 28 . . . 30 and 48 . . . 50 in FIG. 1, and the receiver components of transceiver/receiver 70 . . . 72 and 78 . . . 80 in FIG. 2 may be constructed in various designs. FIG. 8 shows a general block diagram representation of some embodiments of the receiver, although the inventions are not limited to these details. Referring to FIG. 8, receiver 28 includes a magnitude encoded controlled frequency (MECF) decoder 184 that produces an asynchronous decoded output signal (Vout) that has the same logical values as the input signal (Vin) after a time delay (or if it is desired, the output signal Vout could be the inverse of the input signal

TABLE 1

| Vin* | Clk | Output of NOR (input of driver 202) | Output of NAND (input of driver 204) | Output of inverter 156 (input of driver 158) | CFS |
|---|---|---|---|---|---|
| 0 | 0 | 1 | 1 | 1 | full high (e.g., VDD) |
| 0 | 1 | 0 | 1 | 0 | medium low (e.g., 1/3 VDD) |
| 1 | 0 | 0 | 1 | 1 | medium high (e.g., 2/3 VDD) |
| 1 | 1 | 0 | 0 | 0 | full low (e.g., VSS) |

Vin). For example, Vout would be 00111010 in response to the Vin of FIG. 6. Clock deriving circuitry 188 produces a derived clock signal that has the same frequency and is in phase with CFS and CCFS. Synchronizing circuitry 190 uses the derived clock signal to synchronize the asynchronous Vout signal with a system clock, which is a system clock for the chip or portion of chip including receiver 28, to create a synchronized decoded output signal (Vout) signal. (In some embodiments, clock deriving circuitry 188 and synchronizing circuitry 190 are not used.)

Clock deriving circuitry 188 may also provide a derived clock* signal, which is an inverse of the derived clock signal (for example, like Clk and Clk* of FIG. 6 are inverses). In some embodiments, synchronizing circuitry 190 uses both the derived clock and derived clock* signals and in some embodiments, only the derived clock or only the derived clock* signal. MECF decoder 184 may produce an asynchronous decoded* output signal (Vout*). In some embodiments, synchronizing circuitry 190 receives both Vout and Vout* in other embodiments, it receives only Vout or only Vout*. In some embodiments, synchronizing circuitry 190 produces both a synchronized decoded output signal (Vout) and a synchronized decoded* output signal (Vout*), which is an inverse of Vout. In other embodiments, synchronizing circuitry 190 produces only a synchronized Vout or only a synchronized Vout*.

Figure 11:
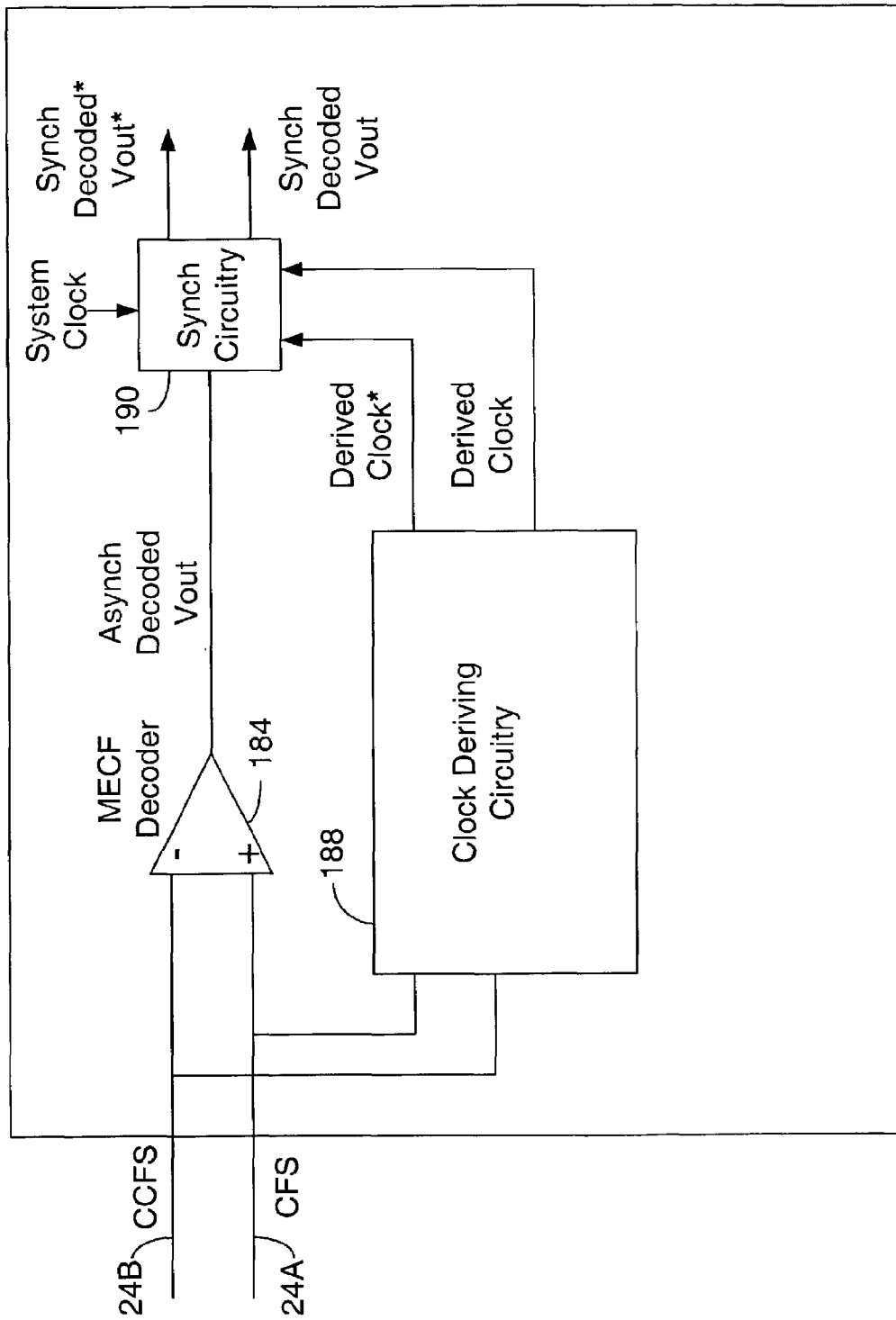
FIG. 11 is a schematic block diagram representation of a receiver in FIG. 1 according to some embodiments of the inventions.
Figure 12:
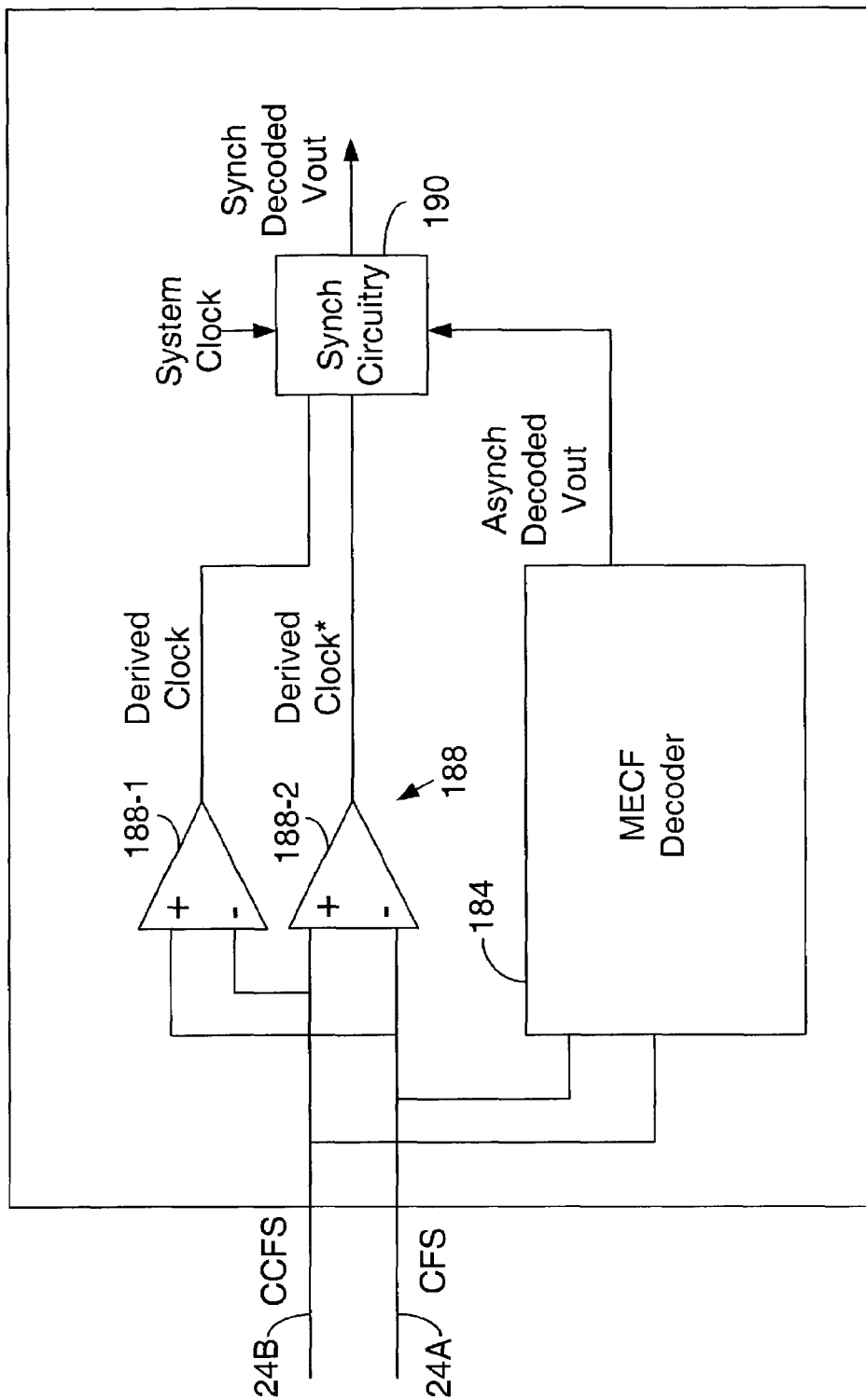
FIG. 12 is a schematic block diagram representation of a receiver in FIG. 1 according to some embodiments of the inventions.
Figure 13:
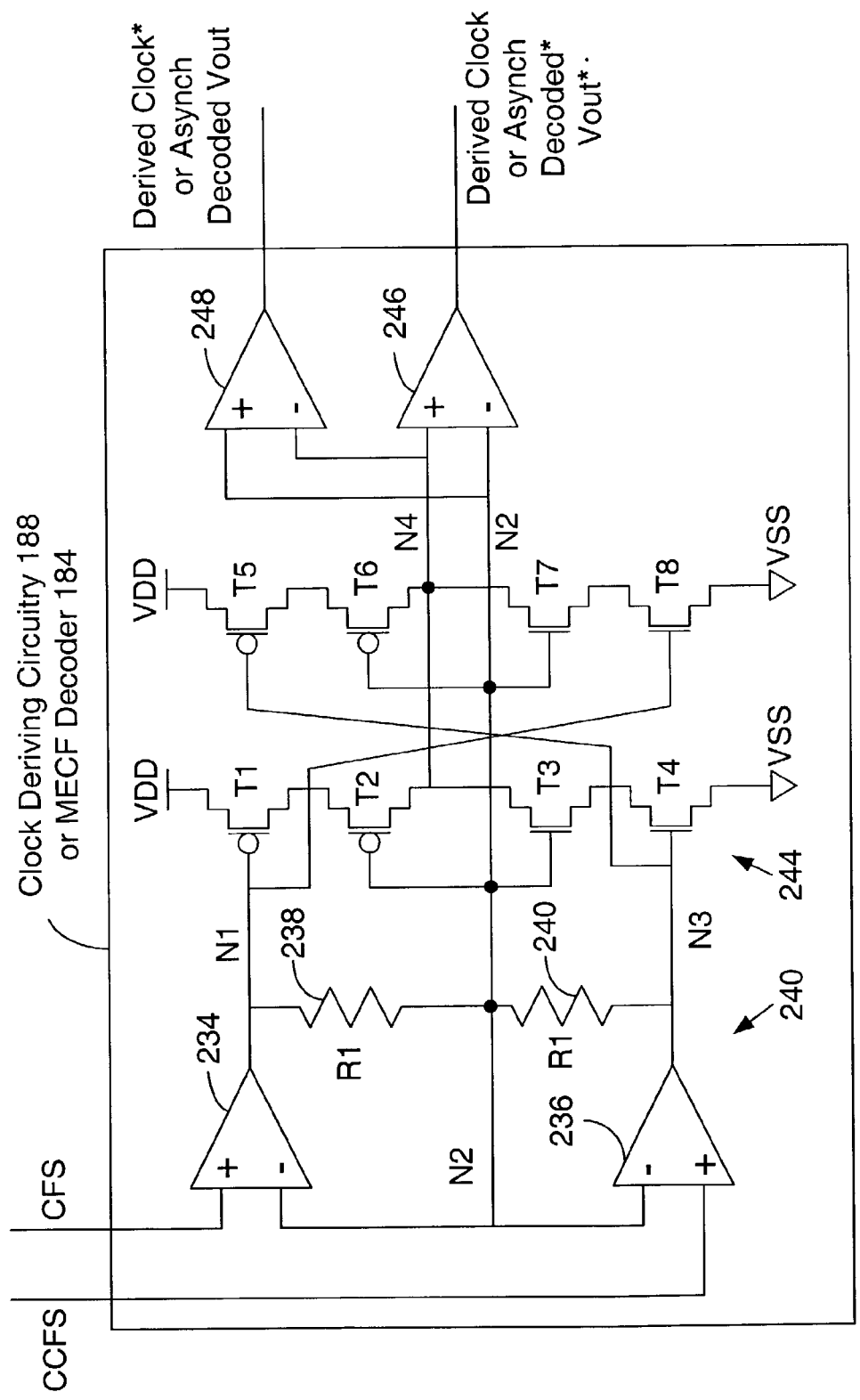
FIG. 13 is a schematic block diagram representation of circuitry that may be used in the receivers of FIGS. 11 and 12 according to some embodiments of the inventions.
Figure 14:
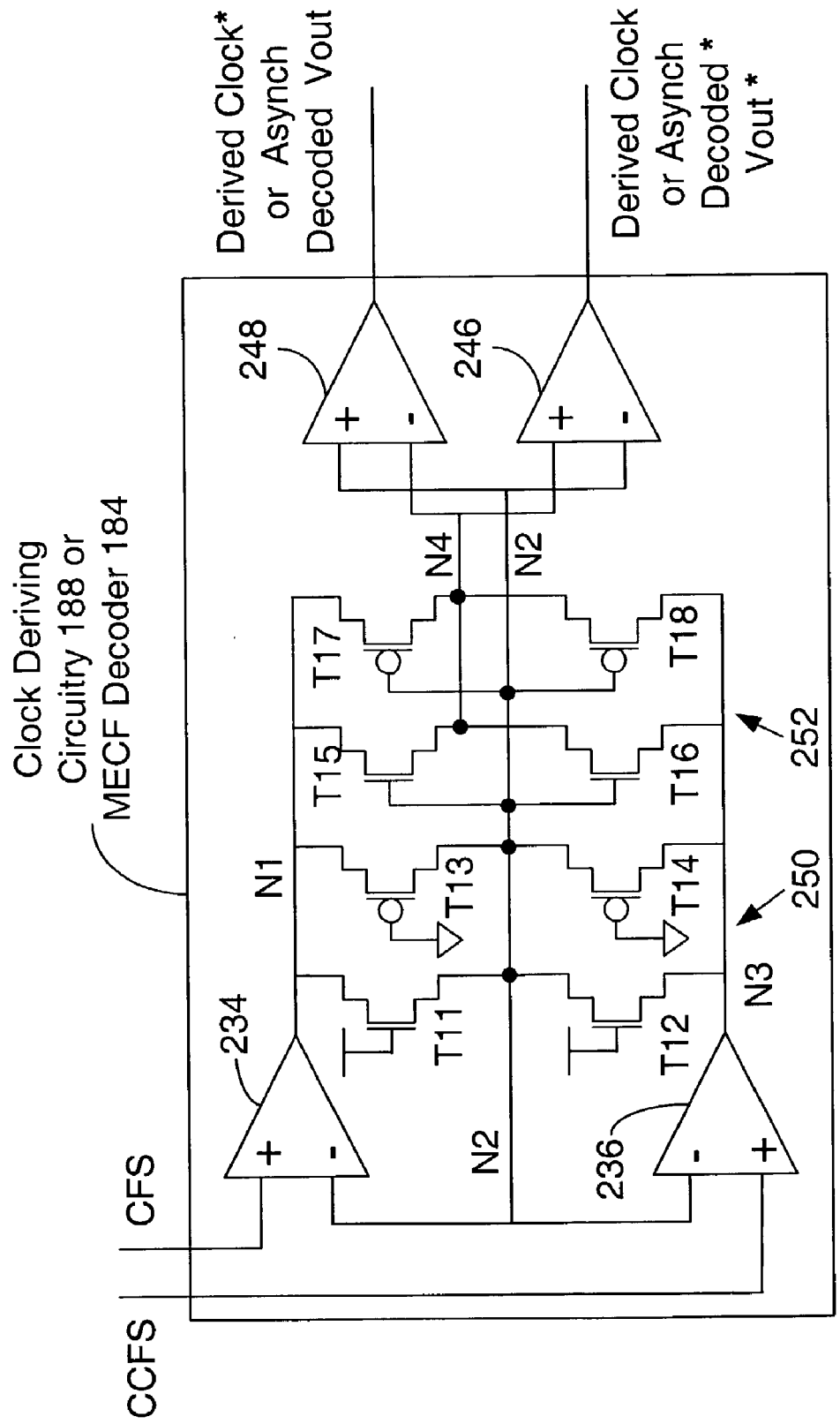
FIG. 14 is a schematic block diagram representation of circuitry that may be used in the receivers of FIGS. 11 and 12 according to some embodiments of the inventions.
Figure 15:
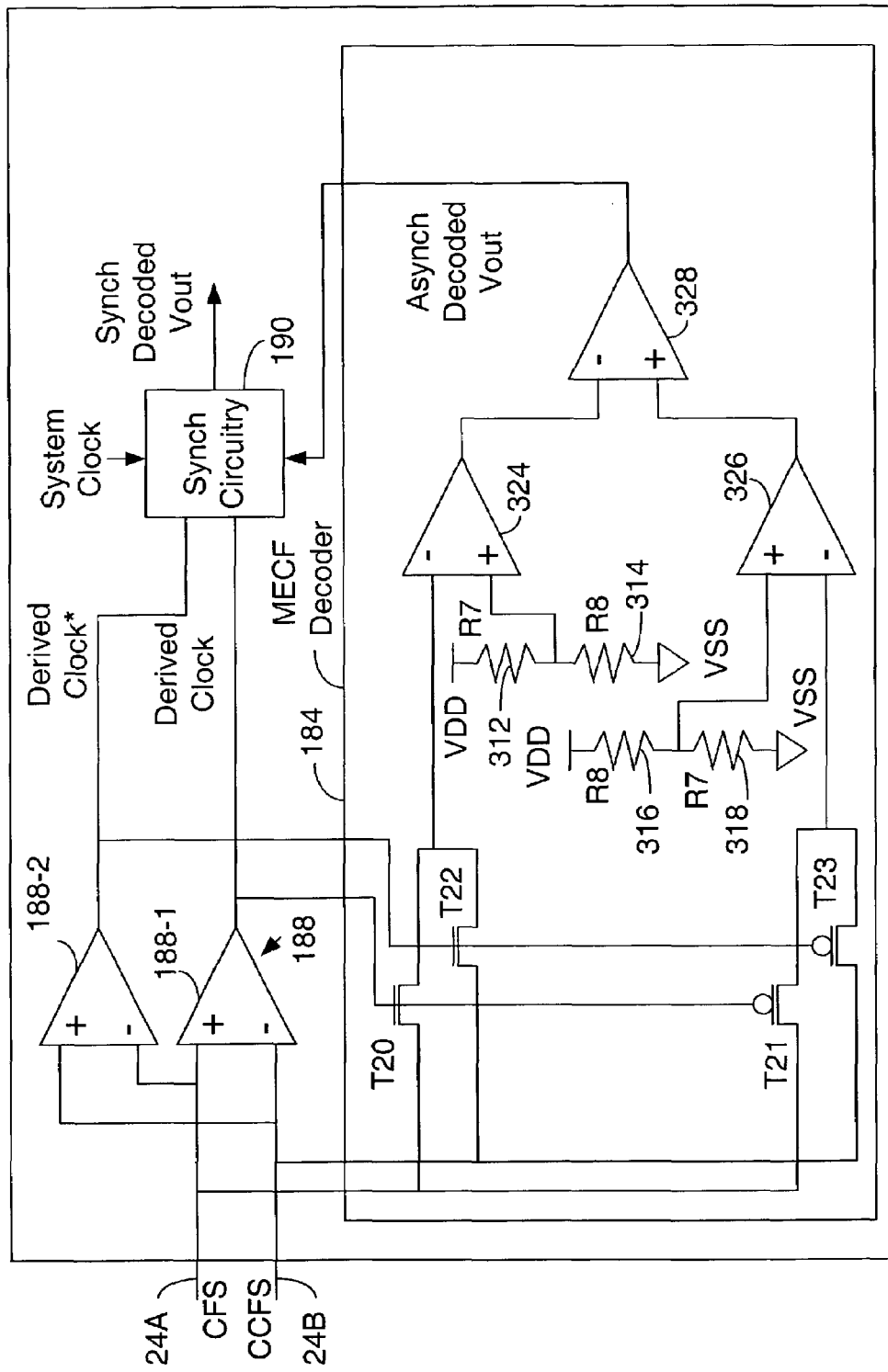
FIG. 15 is a schematic block diagram representation of a receiver in FIG. 1 according to some embodiments of the inventions.

FIGS. 11, 12, and 15 provide examples of receiver 28. FIGS. 13 and 14 provide circuitry that may be used in the examples of FIGS. 11 and 12. The inventions are not limited to these details.

a. Receivers for Decoding CFS and CCFS Created by In Phase Encoding and Power Balanced Encoding.

FIG. 11 provides an example of a receiver 28 for the case in which In Phase Encoding is used in creating CFS and CCFS. In the example of FIG. 11, MECF decoder 184 is a comparator that provides the asynchronous Vout signal. In the illustrated example, the asynchronous Vout signal has a logical 0 voltage when VCCFS>VCFS and a logical 1 voltage when VCFS>VCCFS. (The inverse could be true depending on the implementation.) More elaborate circuits may be used for the MECF decoder. In FIG. 11, synchronizing circuitry 190 provides both synchronized Vout and synchronized Vout* signals. In other embodiments, it may provide only synchronized Vout or synchronized Vout*. Various circuits may be used for clock deriving circuitry 188 to produce the derived clock and derived clock* signals from CFS and CCFS. Examples for clock deriving circuitry 188 are provided in FIGS. 13 and 14.

FIG. 12 provides an example of a receiver 28 for the case in which Power Balanced Encoding is used in creating CFS and CCFS. In the example of FIG. 12, a clock deriving circuitry 188 includes two comparators 188-1 and 188-2 to produce the derived clock and derived clock* signals, which are received by synchronizing circuitry 190. Alternatively, merely the derived clock signal or merely the derived clock* signal may be received by synchronizing circuitry 190. In other embodiments, synchronizing circuitry 190 may provide both synchronized Vout and synchronized Vout* signals, or merely the synchronized Vout* signal. Various circuits may be used for MECF decoding circuitry 184 to produce the asynchronous Vout signal (and asynchronous Vout* if it is produced). Examples for MECF decoder 184 are provided in FIGS. 13 and 14.

FIG. 13 illustrates circuitry that may be used for clock deriving circuitry 188 in FIG. 11, or MECF decoder 184 in FIG. 12. In the example of FIG. 13, the positive inputs of operational amplifiers 234 and 236 receive CFS and CCFS, respectively. The outputs of amplifiers 234 and 236 are coupled to nodes N1 and N3, respectively. The negative inputs of operational amplifiers 234 and 236 are coupled to a node N2.

The voltage swing on conductors 24A and 24B is not necessarily the same as the voltage swing in receiver 28. For ease of discussion, the power supply and ground voltages on conductors 24A and 24B are referred to as Vdd and Vss (see FIG. 7), and the power supply and ground voltages in receiver 28 are referred to as VDD and VSS. The power supply and ground voltages in the transmitter 20 and receiver 28 may be the same or different.

Averaging circuitry 240 is formed of amplifiers 234 and 236, nodes N1, N2, and N3, and resistors 238 and 240, which each have a resistance value R1. Resistors 238 and 240 each may be, for example, formed of an N-type field effect transistor (NFET) and a p-type field effect transistor (PFETs) (such as transistors T11 and T13 in FIG. 14). The transistors may be of a metal oxide semiconductor (MOS) type. The voltage of nodes N1, N2, N3, and N4 are referred to as VN1, VN2, VN3, and VN4, respectively. VN2 is essentially an average of VCFS and VCCFS, that is, (VCFS+VCCFS)/2. VN1 is essentially Ad(VCFS−VCCFS)/2 and VN3 is essentially Ad(VCCFS−VCFS)/2, where Ad is the gain of operation amplifier 234 and 236, respectively.

The term "inverse" is used herein in the context of Clk and Clk* being logical inverses, Vin and Vin* being logical inverses, and Vout and Vout* being logical inverses. In this context, inverse means that if Clk is a logical 0 voltage, then Clk* is a logical 1 voltage and if Clk is a logical 1 voltage, then Clk* is a logical 0 voltage. (Of course, a logical 0 voltage is not necessarily at VSS and a logical 1 voltage is not necessarily at VDD). The same is the case with Vin and Vin* and Vout and Vout*.

Reference inverting circuitry 244 provides a reference inverse of VN2 on node N4. Reference inverting circuitry 244 includes a first inverter including PFET T2 and NFET T3, a second inverter including PFET T6 and NFET T7, and enabling transistors T1, T4, T5, and T8. The term "reference inverse" for VN2 and VN4 is a little more relaxed than the term "inverse" in that VN2 and VN4 are not necessarily within either normal logical 0 or 1 voltages (although they could be within normal logical 0 or 1 voltages). With the reference inverse, VN2 and VN4 are on opposite sides of a reference voltage. For example, in operation, if VN2 is greater than the reference voltage, then VN4 is less it, and if VN2 is less than the reference voltage, then VN4 is greater than it. The precise value of the reference voltage is not important and there is not necessarily a single reference voltage. The reference voltage may be a narrow band of voltages the boundaries of which can change over time.

In the case of In Phase Encoding, FIG. 13 is clock deriving circuitry 188 of FIG. 11. The derived clock and derived clock* signals of comparators 246 and 248 toggle as the signals of CFS and CCFS change as shown in FIG. 7. If VCFS is ⅔ Vdd and VCCFS is Vdd (see FIG. 7 between t0+X and t1+X), then VN2 is close to Vdd (about ⅚ Vdd) and VN1<VN3. With VN1<VN3, enabling transistors T1 and T4 are on and enabling transistors T5 and T8 are off. (When it is said a transistor is on or off, it may mean that the transistor is completely on or off or substantially on or off. The threshold voltages of the transistors can be set to provide a desired level of turning on or off.) With T1 and T4 on, the inverter with T2 and T3 is enabled, and with T5 and T8 off, the inverter with T6 and T7 is disabled. Since VN2 is close to Vdd, T2 is off and T3 is on, so VN4 is pulled toward VSS, such that VN4 and VN2 are on opposite sides of a reference voltage. With VN1 close to Vdd and VN4 at or near VSS, comparator 246 provides a logical 0 voltage output and comparator 248 provides a logical 1 voltage output. Note that this matches the states of Clk and Clk* in FIG. 6 between t0 and t1. As described above, it is optional to include both comparators 246 and 248.

If VCFS is Vss and VCCFS is ⅓ Vdd (see FIG. 7 between t1+X and t2+X), then VN1 is close to Vss (⅙ Vdd) and VN1<VN3. With VN1<VN3, enabling transistors T1 and T4 are on and enabling transistors T5 and T8 are off. Accordingly, the inverter with T2 and T3 is enabled and the inverter with T6 and T7 is disabled. Since VN2 is close to Vss, T2 is on and T3 is off, so VN4 is pulled toward VDD, such that VN4 and VN2 are on opposite sides of a reference voltage. With VN2 close to Vss and VN4 at or near VDD, comparator 246 provides a logical 1 voltage output and comparator 248 provides a logical 0 voltage output. Note that this matches the states of Clk and Clk* in FIG. 6 between t1 and t2.

If VCFS is Vdd and VCCFS is ⅔ Vdd (see FIG. 7 between t2+X and t3+X), then VN2 is close to Vdd (⅚ Vdd) and VN1>VN3. With VN1>VN3, enabling transistors T1 and T4 are off and enabling transistors T5 and T8 are on. Accordingly, the inverter with T2 and T3 is disabled and the inverter with T6 and T7 is enabled. Since VN2 is close to Vdd, T6 is off and T7 is on, so VN4 is pulled toward VSS, such that VN4 and VN2 are on opposite sides of a reference voltage. With VN2 close to Vdd and VN4 at or near VSS, comparator 246 provides a logical 0 voltage output and comparator 248 provides a logical 1 voltage output. Note that this matches the states of Clk and Clk* in FIG. 6 between t2 and t3.

If VCFS is ⅓ Vdd and VCCFS is Vss (see FIG. 7 between t3+X and t4+X), then VN2 is close to Vss (⅙ Vdd) and VN1>VN3. With VN1>VN3, enabling transistors T1 and T4 are off and enabling transistors T5 and T8 are on. Accordingly, the inverter with T2 and T3 is disabled and the inverter with T6 and T7 is enabled. Since VN2 is close to Vss, T6 is on and T7 is off, so VN4 is pulled toward VDD, such that VN4 and VN2 are on opposite sides of a reference voltage. With VN2 close to Vss and VN4 at or near VDD, comparator 246 provides a logical 1 voltage output and comparator 248 provides a logical 0 voltage output. Note that this matches the states of Clk and Clk* in FIG. 6 between t3 and t4.

In the case of Power Balanced Encoding, FIG. 13 is MECF decoder 184 in FIG. 12. The state of the asynchronous decoded output signal Vout output by comparator 248 is a function of the voltages of CFS and CCFS. If it is included, comparator 246 provides Vout*. If VCFS is Vss and VCCFS is ⅔ Vdd (see FIG. 7 between t0+X and t1+X), then VN2 is about ⅓ Vdd and VN1<VN3. With VN1<VN3, enabling transistors T1 and T4 are on and enabling transistors T5 and T8 are off so that only the inverter with T2 and T3 is enabled. Since VN2 is ⅓ Vdd, T2 is on and T3 is off, so VN4 is pulled toward VDD, such that VN4 and VN2 are on opposite sides of a reference voltage. With VN2 close to Vss and VN4 at or near VDD, comparator 246 provides a logical 1 voltage output for Vout* and comparator 248 provides a logical 0 voltage output for Vout, which matches Vin of FIG. 6 between time t0 and t1. In some embodiments, only comparators 246 is included; in some embodiments, only comparator 248 is included; and in some embodiments, both comparators 246 and 248 are included. Synchronizing circuitry 190 may invert the output of MECF 184 depending on the implementation.

If VCFS is ⅔ Vdd and CCFS is Vss (see FIG. 7 between t1+X and t2+X), then VN2 is about ⅓ Vdd and VN1>VN3. With VN1>VN3, enabling transistors T1 and T4 are off and enabling transistors T5 and T8 are on so that only the inverter with T6 and T7 is enabled. Since VN2 is ⅓ Vdd, T6 is on and T7 is off, so VN4 is pulled toward VDD, such that VN4 and VN2 are on opposite sides of a reference voltage. With VN2 close to Vss and VN4 at or near VDD, comparator 246 provides a logical 1 voltage output for Vout* and comparator 248 provides a logical 0 voltage output for Vout, which matches Vin of FIG. 6 between time t1 and t2.

If VCFS is ⅓ Vdd and CCFS is Vdd (see FIG. 7 between t2+X and t3+X), then VN2 is about ⅔ Vdd and VN1>VN3. With VN1>VN3, enabling transistors T1 and T4 are on and enabling transistors T5 and T8 are off so that only the inverter with T2 and T3 is enabled. Since VN2 is ⅔ Vdd, T2 is off and T3 is on, so VN4 is pulled toward VSS, such that VN4 and VN2 are on opposite sides of a reference voltage. With VN2 close to Vdd and VN4 at or near VSS, comparator 246 provides a logical 0 voltage output for Vout* and comparator 248 provides a logical 1 voltage output for Vout, which matches Vin of FIG. 6 between time t2 and t3.

If VCFS is Vdd and CCFS is ⅓ Vdd (see FIG. 7 between t3+X and t4+X), then VN2 is about ⅔ Vdd and VN1>VN3. With VN1>VN3, enabling transistors T1 and T4 are off and enabling transistors T5 and T8 are on so that only the inverter with T6 and T7 is enabled. Since VN2 is ⅔ Vdd, T7 is on and T6 is off, so VN4 is pulled toward VSS, such that VN4 and VN2 are on opposite sides of a reference voltage. With VN2 close to Vdd and VN4 at or near VSS, comparator 246 provides a logical 0 voltage output for Vout* and comparator 248 provides a logical 1 voltage output for Vout, which matches Vin of FIG. 6 between time t3 and t4.

The beta's of each of the transistors may be the same. However, by having transistors T1, T4, T5, and T8 have a smaller beta than for the transistors of the inverters, superior level shifting from Vdd and Vss to VDD and VSS may occur and the gain may be flatter.

FIG. 14 provides another example of circuitry that may be used for clock deriving circuitry 188 in FIG. 11, or MECF decoder 184 in FIG. 12. FIG. 14 is similar to FIG. 13 but with some differences. Transistors T11 and T13, and T12 and 14 in FIG. 14 are shown in place of resistor 238 and resistor 240 in FIG. 13. Further, FIG. 14 does not include enabling transistors such as T1, T4, T5, and T8 in FIG. 13. In FIG. 14, when VN2 is low, transistors T15 and T16 are off and T17 and T18 are on providing a degraded reference inverter (having weak contention) causing node VN4 to be pulled high. When VN2 is high, transistors T17 and T18 are off and T15 and T16 are on providing a degraded reference inverter (having weak contention) causing node VN4 to be pulled low. The beta's of the transistors may be the same or different.

b. Receivers for Decoding CFS and CCFS Created by Offset Balanced Encoding.

FIG. 15 provides an example of a receiver 28 for the case in which Offset Balanced Encoding is used in creating CFS and CCFS. Note the high and low thresholds of FIG. 7. In the example of FIG. 15, clock deriving circuitry 188 includes two comparators 188-1 and 188-2 to produce the derived clock and derived clock* signals, which are received by synchronizing circuitry 190. Alternatively, merely the derived clock signal or merely the derived clock* signal may be received by synchronizing circuitry 190. In other embodiments, synchronizing circuitry 190 may provide both synchronized Vout and synchronized Vout* signals, or merely the synchronized Vout* signal. Various circuits may be used for MECF decoding circuitry 184 to produce the asynchronous Vout signal (and asynchronous Vout* if it is produced).

FIG. 15 provides an example of an MECF decoder 184, but the inventions are not limited to these details.

Referring to MECF decoder 184 of FIG. 15, transistors T20, T21, T22, and T23 act as multiplexers. At its positive input, comparator 324 receives a voltage corresponding to the high threshold voltage (shown in FIG. 7) from a divider including a resistor 312 having a resistance R7 and a resistor 314 having a resistance R8, where R8>R7. At its positive input, comparator 326 receives a voltage corresponding to the low threshold voltage (shown in FIG. 7) from a divider including a resistor 316 having a resistance R8 and a resistor 318 having a resistance R7.

In the case in which Vin is a logical 0 voltage, VCFS and VCCFS are within the high and low thresholds (t0+X to t2+X in FIG. 7). If VCFS>VCCFS, then derived clock is a logical 1 voltage and derived clock* is logical 0 voltage so that T20 and T23 are on and T21 and T22 are off. CFS is passed to the negative input of comparator 324 and CCFS is passed to the negative input of comparator 326. With VCFS<high threshold, the output of comparator 324 is a logical 1 voltage. With VCCFS>low threshold, the output of comparator 326 is logical 0 voltage. Therefore, comparator 328 outputs Vout as a logical 0 voltage which matches Vin for t0 to t1 in FIG. 6. Alternatively, Vout could be the inverse of Vin. An additional comparator could provide Vout*.

If VCFS<VCCFS, then derived clock is a logical 0 voltage and derived clock* is logical 1 voltage so that T20 and T23 are off and T21 and T22 are on. CCFS is passed to the negative input of comparator 324 and CFS is passed to the negative input of comparator 326. With VCCFS<high threshold, the output of comparator 324 is a logical 1 voltage. With VCFS>low threshold, the output of comparator 326 is logical 0 voltage. Therefore, comparator 328 outputs Vout as a logical 0 voltage which matches Vin for to t0 t1 in FIG. 6.

In the case in which Vin is a logical 1 voltage, VCFS and VCCFS are outside the high and low thresholds (t2+X to t5+X in FIG. 7). If VCFS>VCCFS, then derived clock is a logical 1 voltage and derived clock* is logical 0 voltage so that T20 and T23 are on and T21 and T22 are off. CFS is passed to the negative input of comparator 324 and CCFS is passed to the negative input of comparator 326. With VCFS>high threshold, the output of comparator 324 is logical 0 voltage. With VCCFS<low threshold, the output of comparator 326 is a logical 1 voltage. Therefore, comparator 328 outputs Vout as a logical 1 voltage which matches Vin for t2 to t3 in FIG. 6. If VCFS<VCCFS, then derived clock is logical 0 voltage and derived clock* is logical 1 voltage so that T20 and T23 are off and T21 and T22 are on. CCFS is passed to the negative input of comparator 324 and CFS is passed to the negative input of comparator 326. With VCCFS>high threshold, the output of comparator 324 is logical 0 voltage. With VCFS<low threshold, the output of comparator 326 is logical 1 voltage. Therefore, comparator 328 outputs Vout as a logical 1 voltage which matches Vin for t3 to t4 in FIG. 6.

3. Additional Information and Embodiments.

Figure 16:
FIG. 16 is a schematic block diagram representation of a system according to some embodiments of the inventions.

As described above, there are advantages to using both the CFS and CCFS signals in combination to convey information. However, the information can be conveyed in the CFS alone. (Recall that in FIG. 7 the choice of which signal to label CFS and which to label CCFS is arbitrary.) For example, in FIG. 16, transmitter 350 provides the Vin (or Vin*) information in the CFS alone through conductor 24A to a receiver 358 which recovers the information as Vout (or Vout*).

Figure 17:
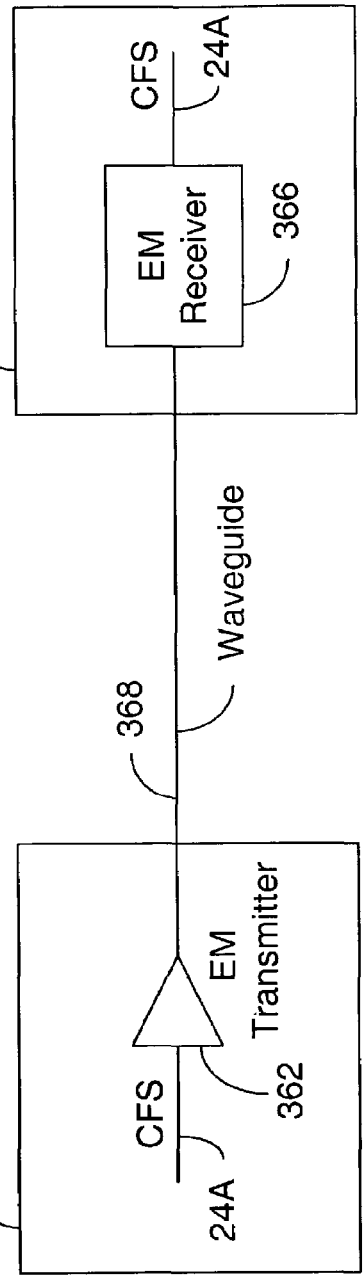
FIG. 17 is a schematic block diagram representation of a system according to some embodiments of the inventions.

The inventions are not limited to a particular type of interconnect between the transmitter and receiver circuitry. For example, the illustrated versions of the transmitters and receivers show the interconnects as being electrical conductors that carry conventional electrical signals. However, various other types of interconnects could be used including electromagnetic interconnects (for example, waveguides (including fiber optics) and radio-frequency (RF)). Merely as an example, FIG. 17 illustrates an EM transmitter 362 in a transmitter such as, for example, transmitter 20 or 350 and provides it to an EM receiver 366 in a receiver such as, for example, receiver 28 or 358. EM transmitter 362 receives the CFS on conductor 24A and provides it on a waveguide 368 to EM receiver 366 which provides the received CFS to conductor 24A. The information of CFS can be carried as an optical signal on waveguide 368. It is possible, but perhaps not practical, to use an optical signal without a waveguide. In the case in which FIG. 17 includes transmitter 20, there also would be another waveguide for CCFS and conductor 24B.

Figure 18:
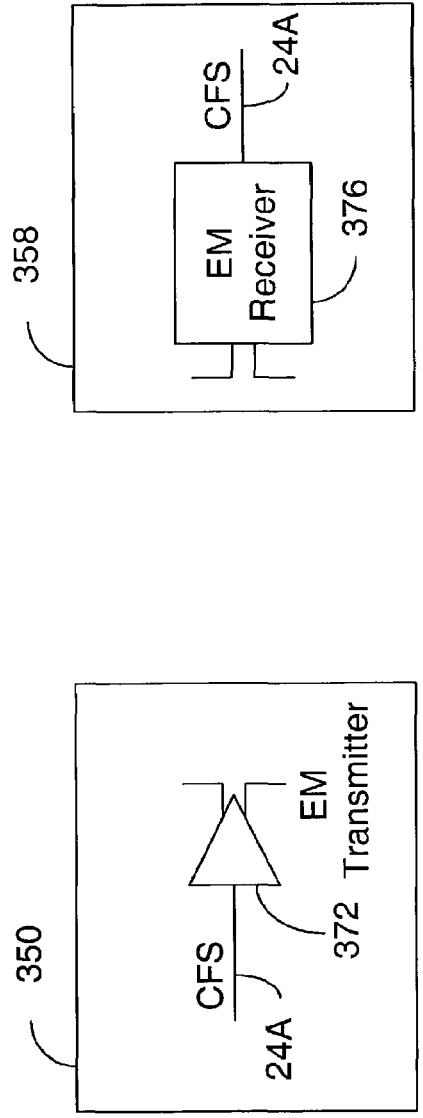
FIG. 18 is a schematic block diagram representation of a system according to some embodiments of the inventions.

FIG. 18 illustrates a system similar to that of FIG. 17 except that EM transmitter 372 is a wireless transmitter and EM receiver 376 is a wireless receiver. FIG. 18 may involve wireless techniques such as RF. Transmitter 372 and receiver 376 may include λ/4 antennas.

Conductors 24A and 24B are not necessarily continuous but could include intermediate circuitry, vias etc. The conductors may include capacitors for AC coupling although that may slow the switching speed.

The inventions may be used in point-to-point interconnect systems as shown in FIGS. 1 and 2 in which there is one receiver for each transmitter. The inventions could also be used in a system in which a signal is transmitted from one transmitter to multiple receivers.

The transmitters and receivers are illustrated in terms of encoding merely logical 0 or 1 voltages for CFS and CCFS. Alternatively, more than two logical values could be encoded in CFS and CCFS. For example, referring to FIG. 19, encoding controlled frequency output circuitry includes a third encode driver 410 to allow more than two voltage levels (more than merely a logical 0 and logical 1 value, but also a logical 2 value). The magnitude encoder and receivers may be changed accordingly.

The inventions are not limited to a particular type, format, content, or meaning for CFS and CCFS being transmitted. In some embodiments, some conductors carrying commands, while others carry address, and others carry data. In some embodiments, commands, address, and data are provided in a multiplexed signal. In some embodiments, commands may be carried through transmitters and receivers using different signaling. Various encoding techniques such as 8b/10b encoding may be used with the encoding techniques described herein. The illustrated circuits are merely examples. The polarities of the various signals may change.

The illustrated circuitry may include additional circuitry such as electrostatic discharge (ESD) circuitry, enable signal control circuitry, and timing chains. In alternative embodiments, the CFS could be carried differentially on two conductors and CCFS could be carried differentially on two conductors.

There are various ways in which the Clk, Clk*, Vin, and Vin* signals may be produced. FIG. 20 illustrates circuitry for providing these signals, but the inventions do not require this circuitry. A multi-phase circuit 420 includes toggle circuits 422 and 424 (which may be flip-flops) receive the Clk signal and provide toggled outputs to exclusive-OR gate 428 and exclusive-NOR gate 430. The output of gate 428 is provided to a timing chain including a buffer 432 and an inverter 434 to provide the Clk signal on conductor 102. The output of gate 430 is provided to a timing chain including a buffer 436 and an inverter 438 to provide the Clk* signal on conductor 104. In a similar way, a multi-phase circuit 440 includes toggle circuits 442 and 444 (which may be flip-flops) receive the Clk signal and provide toggled outputs to exclusive-OR gate 448 and exclusive-NOR gate 450. The output of gate 448 is provided to a timing chain including a buffer 452 and an inverter 454 to provide the Vin signal on conductor 106. The output of gate 450 is provided to a timing chain including a buffer 456 and an inverter 458 to provide the Vin* signal on conductor 108. A purpose of the timing chains is to increase the drive current of the Clk, Clk*, Vin and Vin* signals. The polarities of the signals can be changed through modifications to the circuitry. Timing chains also may be used in the transmitters and/or receivers described above to increase drive current.

The term "responsive" means one thing or event at least partially causes another thing or event, although there may be other causes for the thing or event.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a chip, feature, structure, or characteristic "may", "might", or "could" be included, that particular chip, feature, structure, or characteristic is not required to be included. If the specification or claim refers to "a" or "an" element, that does not mean there is only one of the element. If the specification or claims refer to "an additional" element, that does not preclude there being more than one of the additional element.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A chip comprising:
a transmitter including:
encoding controlled frequency output circuitry to receive at least one input signal and at least one clock signal and to create a magnitude encoded controlled frequency signal (CFS) responsive thereto, wherein the CFS has values encoded in its magnitude and has substantially all of its energy restricted to a single frequency.

2. The chip of claim 1, wherein the encoding controlled frequency output circuitry is first encoding controlled frequency output circuitry and wherein the transmitter further comprises second encoding controlled frequency output circuitry to receive at least one input signal and at least one clock signal and to create a complementary magnitude encoded controlled frequency signal (CCFS) responsive thereto, wherein the CCFS has values encoded in its magnitude and has substantially all of its energy restricted to a single frequency.

3. The chip of claim 2, wherein the CFS and CCFS are encoded according to in phase magnitude encoding and wherein the magnitudes of the CFS and CCFS change with time.

4. The chip of claim 3, wherein the first and second encoding controlled frequency output circuitry each receive only one clock signal and the clock signal is the same for the first and second encoding controlled frequency output circuitry, and wherein the first and second encoding controlled frequency output circuitry each receive only one input signal and the input signal received by the first encoding controlled frequency output circuitry is a logical inverse of the input signal received by the second encoding controlled frequency output circuitry.

5. The chip of claim 2, wherein the CFS and CCFS are encoded according to power balanced magnitude encoding.

6. The chip of claim 5, wherein the first and second encoding controlled frequency output circuitry each receive only one input signal and the input signal is the same for the first and second encoding controlled frequency output circuitry, and wherein the first and second encoding controlled frequency output circuitry each receive only one clock signal and the clock signal received by the first encoding controlled frequency output circuitry is a logical inverse of the clock signal received by the second encoding controlled frequency output circuitry.

7. The chip of claim 2, wherein the CFS and CCFS are encoded according offset balanced magnitude encoding.

8. The chip of claim 7, wherein the first and second encoding controlled frequency output circuitry each receive two input signals that are logical inverses of each other, and wherein the first and second encoding controlled frequency output circuitry each receive only one clock signal and the clock signal received by the first encoding controlled frequency output circuitry is a logical inverse of the clock signal received by the second encoding controlled frequency output circuitry.

9. The chip of claim 2, further comprising a receiver to receive the CFS and CCFS and decode them to produce an output signal.

10. The chip of claim 9, further comprising additional transmitters and additional receivers.

11. The chip of claim 2, wherein the first and second encoding controlled frequency output circuitry each include a magnitude encoder, a controlled frequency driver, and magnitude drivers coupled to the magnitude encoder, and wherein the controlled frequency driver and the magnitude drivers combine to provide the respective CFS or CCFS on a conductor.

12. The chip of claim 11, wherein the magnitude drivers include more than two encode drivers.

13. The chip of claim 1, wherein the encoding controlled frequency output circuitry includes a magnitude encoder, a controlled frequency driver, and magnitude drivers coupled to the magnitude encoder, and wherein the controlled frequency driver and the magnitude drivers combine to provide the CFS on a conductor.

14. The chip of claim 1, further comprising a receiver to receive the CFS and decode it and produce an output signal responsive thereto.

15. A system comprising:
a first chip including a transmitter including:
encoding controlled frequency output circuitry to receive at least one input signal and at least one clock signal and to create a magnitude encoded controlled frequency signal (CFS) responsive thereto; and a second chip including a receiver to receive the CFS and to provide an output signal responsive thereto, wherein the CFS has values encoded in its magnitude and has substantially all of its energy restricted to a single frequency.

16. The system of claim 15, wherein the output signal is a time delayed version of the input signal.

17. The system of claim 15, wherein the output signal is a logical inversion of a time delayed version of the input signal.

18. The system of claim 15, wherein the first and second chips are coupled through a first conductor that carries the CFS to the receiver.

19. The system of claim 15, wherein the first and second chips are coupled through a first wave guide that carries the CFS to the receiver.

20. The system of claim 15, wherein the CFS is transmitted as an RF signal between the first and second chips.

21. A system comprising:
a first chip including a transmitter including:
first encoding controlled frequency output circuitry to receive at least one input signal and at least one clock signal and to create a magnitude encoded controlled frequency signal (CFS) responsive thereto; and
second encoding controlled frequency output circuitry to receive at least one input signal and at least one clock signal and to create a complementary magnitude encoded controlled frequency signal (CCFS) responsive thereto; and a second chip including a receiver to receive the CFS and CCFS and to provide an output signal responsive thereto, wherein the CFS and CCFS each have values encoded in their magnitudes and have substantially all of their energy restricted to a single frequency.

22. The system of claim 21, wherein the output signal is a time delay version of the input signal.

23. The system of claim 21, wherein the output signal is an inversion of a time delay version of the input signal.

24. The system of claim 21, wherein the first and second chips are coupled through a first conductor that carries the CFS to the receiver and a second conductor that carries the CCFS to the receiver.

25. The system of claim 24, wherein the first chip also includes a receiver and the second chip also includes a transmitter.

26. The system of claim 24, wherein the first and second conductors are bi-directional.

27. The system of claim 21, wherein the first and second chips are coupled through a first wave guide that carries the CFS to the receiver and a second waveguide that carries the CCFS to the receiver.

28. The system of claim 21, wherein the CFS and CCFS are transmitted as RF signals between the first and second chips.

* * * * *

UNITED STATES PATENT AND TRADEMARK OFFICE
CERTIFICATE OF CORRECTION

| | | |
|---|---|---|
| PATENT NO. | : 7,224,739 B2 | Page 1 of 1 |
| APPLICATION NO. | : 10/226074 | |
| DATED | : May 29, 2007 | |
| INVENTOR(S) | : Griffin et al. | |

It is certified that error appears in the above-identified patent and that said Letters Patent is hereby corrected as shown below:

In column 11, at line 34, delete "to".

In column 11, at line 35, after "t0" insert --to--.

Signed and Sealed this

Twenty-ninth Day of April, 2008

JON W. DUDAS
*Director of the United States Patent and Trademark Office*